(12) United States Patent
Maruyama

(10) Patent No.: US 8,982,966 B2
(45) Date of Patent: Mar. 17, 2015

(54) MOVING IMAGE DECODER AND MOVING IMAGE DECODING METHOD

(75) Inventor: Emi Maruyama, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 13/371,225

(22) Filed: Feb. 10, 2012

(65) Prior Publication Data

US 2013/0028318 A1 Jan. 31, 2013

(30) Foreign Application Priority Data

Jul. 28, 2011 (JP) ................................. 2011-166086

(51) Int. Cl.
| | | |
|---|---|---|
| *H04N 19/27* | (2014.01) | |
| *H04N 19/117* | (2014.01) | |
| *H04N 19/127* | (2014.01) | |
| *H04N 19/44* | (2014.01) | |
| *H04N 19/172* | (2014.01) | |
| *H04N 19/159* | (2014.01) | |
| *H04N 19/42* | (2014.01) | |
| *H04N 19/156* | (2014.01) | |
| H04N 19/597 | (2014.01) | |

(52) U.S. Cl.
CPC ... *H04N 19/00103* (2013.01); *H04N 19/00066* (2013.01); *H04N 19/00533* (2013.01); *H04N 19/00266* (2013.01); *H04N 19/00218* (2013.01); *H04N 19/00478* (2013.01); *H04N 19/00206* (2013.01); *H04N 19/00769* (2013.01)
USPC ............. 375/240.29; 375/240.12; 375/240.24

(58) Field of Classification Search
None
See application file for complete search history.

(56) References Cited

U.S. PATENT DOCUMENTS

| | | | | |
|---|---|---|---|---|
| 7,167,522 | B2 * | 1/2007 | Webb ........................ | 375/240.29 |
| 7,450,641 | B2 | 11/2008 | Sun et al. | |
| 7,583,731 | B2 * | 9/2009 | Hagai et al. .............. | 375/240.13 |
| 7,613,240 | B2 | 11/2009 | Sun et al. | |
| 7,787,542 | B2 | 8/2010 | Sun et al. | |
| 7,907,667 | B2 | 3/2011 | Sun et al. | |
| 7,929,610 | B2 * | 4/2011 | Sun .......................... | 375/240.16 |

(Continued)

FOREIGN PATENT DOCUMENTS

| | | |
|---|---|---|
| JP | 2005-503737 | 2/2005 |
| JP | 2007-208476 | 8/2007 |

(Continued)

OTHER PUBLICATIONS

Japanese Patent Application No. 2011-166086, Notice of Reasons for Rejection, mailed Jun. 19, 2012, (with English Translation).

*Primary Examiner* — William C Vaughn, Jr.
*Assistant Examiner* — Michael Bennett
(74) *Attorney, Agent, or Firm* — Blakely, Sokoloff, Taylor & Zafman LLP

(57) ABSTRACT

In one embodiment, there is provided a moving image decoder for decoding a compression-coded moving image stream. The decoder includes: a deblocking filter configured to perform deblocking filter processing on each of frames to be decoded; a load detector configured to detect a magnitude of internal processing loads occurring inside a video player, including a processing load for decoding; a determination module configured to determine whether to bypass the deblocking filter processing, depending on the magnitude of the internal processing loads. The deblocking filter is configured to bypass the deblocking filter processing, if the magnitude of the internal processing loads is bigger than a threshold value and a processing subject block of the frame is decoded using inter-view prediction.

8 Claims, 9 Drawing Sheets

(56) References Cited

U.S. PATENT DOCUMENTS

| | | |
|---|---|---|
| 7,961,791 B2 | 6/2011 | Kawashima et al. |
| 8,040,957 B2 | 10/2011 | Sun et al. |
| 8,107,761 B2 * | 1/2012 | Chuang ................. 382/268 |
| 8,599,935 B2 | 12/2013 | Kawashima et al. |
| 8,711,950 B2 * | 4/2014 | Minamoto ............ 375/240.29 |
| 2003/0053541 A1 | 3/2003 | Sun et al. |
| 2004/0190626 A1 | 9/2004 | Sun et al. |
| 2006/0171472 A1 | 8/2006 | Sun et al. |
| 2006/0203909 A1 * | 9/2006 | Kitada et al. ......... 375/240.12 |
| 2006/0233253 A1 * | 10/2006 | Shi et al. ............. 375/240.16 |
| 2006/0268988 A1 | 11/2006 | Sun et al. |
| 2007/0025448 A1 * | 2/2007 | Cha et al. ............ 375/240.24 |
| 2007/0098076 A1 | 5/2007 | Sun et al. |
| 2007/0098077 A1 | 5/2007 | Sun et al. |
| 2007/0098278 A1 | 5/2007 | Sun et al. |
| 2007/0177669 A1 | 8/2007 | Kawashima et al. |
| 2007/0189735 A1 | 8/2007 | Kawashima et al. |
| 2009/0028249 A1 | 1/2009 | Gomila et al. |
| 2009/0141814 A1 | 6/2009 | Yin et al. |
| 2010/0061645 A1 * | 3/2010 | Wilkins et al. ............. 382/238 |
| 2010/0142835 A1 * | 6/2010 | Nakagami et al. ........ 382/233 |
| 2010/0260264 A1 | 10/2010 | Sun et al. |
| 2012/0106839 A1 * | 5/2012 | Foo et al. ................. 382/166 |

FOREIGN PATENT DOCUMENTS

| | | |
|---|---|---|
| JP | 2007-208552 | 8/2007 |
| JP | 2009-522937 | 6/2009 |
| JP | 2009-522941 | 6/2009 |
| JP | 4643437 | 12/2010 |

* cited by examiner

US 8,982,966 B2

MOVING IMAGE DECODER AND MOVING IMAGE DECODING METHOD

This application claims priority from Japanese Patent Application No. 2011-166086, filed on Jul. 28, 2011, the entire contents of which are hereby incorporated by reference.

BACKGROUND

1. Field

Embodiments described herein relate to a moving image decoder and a moving image decoding method.

2. Description of the Related Art

MPEG4-AVC/H.264 (hereinafter abbreviated as H.264) supports the multiview codec (hereinafter abbreviated as MVC). Typical examples of multiview video as a coding subject of the MVC are "3D video" and stereoscopic video produced with multiple viewing points. Two pieces of 2D video (or two pieces of video produced through processing in which a parallax between the left eye and the right eye is taken into consideration) taken from different angles for the left eye and the right eye are provided as "3D video." "3D video" can be recognized as stereoscopic video when reproduced by inputting the left-eye image and the right-eye image to the left eye and the right eye, respectively.

The MVC has features that inter-view prediction is introduced in addition to time-axis prediction and that a signal processor is not changed though header information of a stream is increased slightly. Therefore, a parallax vector indicating a displacement of a pixel block in inter-view prediction and a motion vector of a pixel block in inter prediction are subjected to the same signal processing.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided a moving image decoder for decoding a compression-coded moving image stream. The decoder includes: a deblocking filter configured to perform deblocking filter processing on each of frames to be decoded; a load detector configured to detect a magnitude of internal processing loads occurring inside a video player, including a processing load for decoding; a determination module configured to determine whether to bypass the deblocking filter processing, depending on the magnitude of the internal processing loads. The deblocking filter is configured to bypass the deblocking filter processing, if the magnitude of the internal processing loads is bigger than a threshold value and a processing subject block of the frame is decoded using inter-view prediction.

Embodiments of the present invention will be hereinafter described.

Embodiment 1

A first embodiment will be described below with reference to FIGS. 1-4, 8, and 9.

Figure 9:
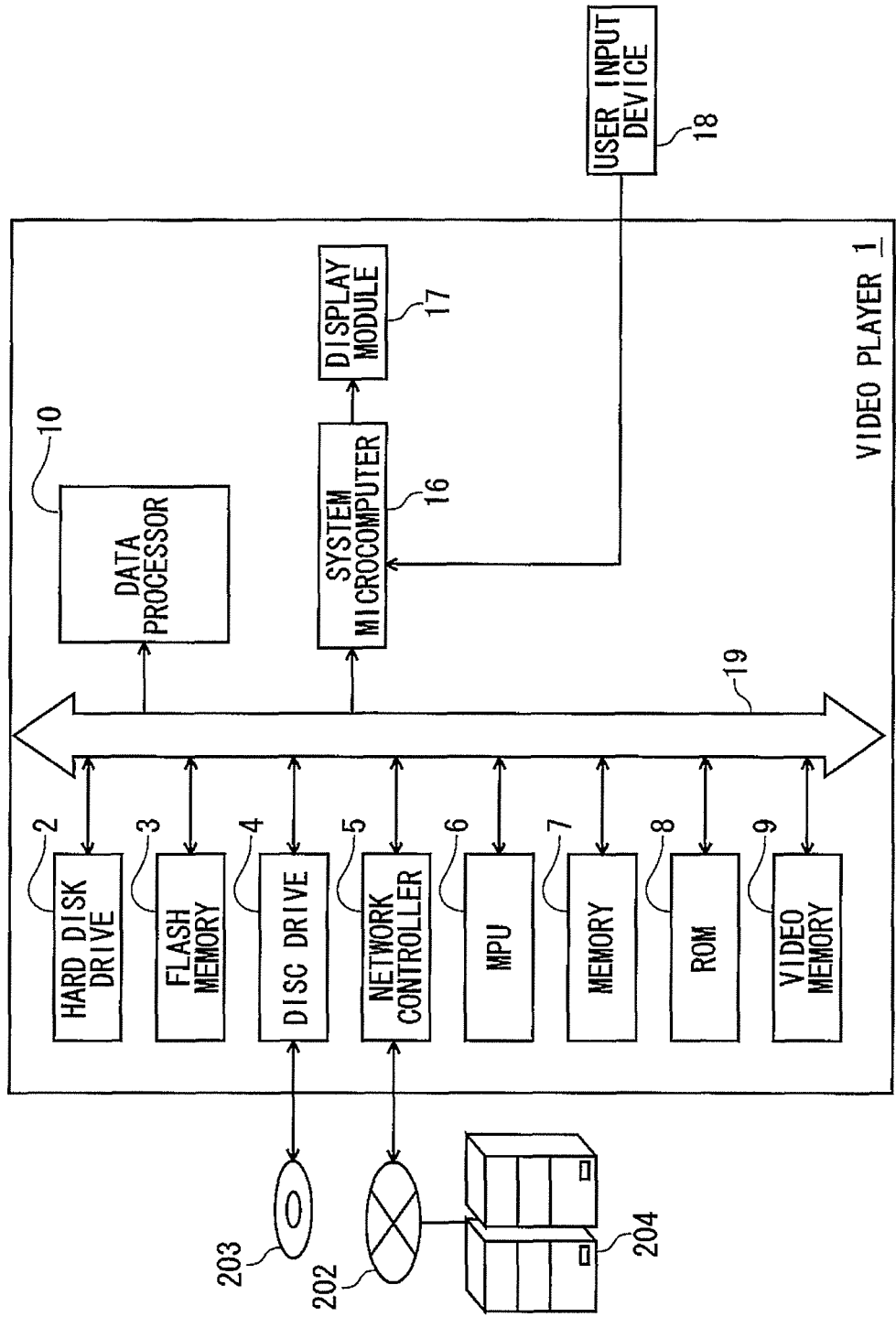
FIG. 9 is a block diagram showing the internal configuration of a video player that includes a moving image decoder according to the first embodiment, in addition to a recording medium and a network storage.

A moving image decoder 100 according to this embodiment is provided in a video player 1 shown in FIG. 9. FIG. 9 is a block diagram showing the internal configuration of the video player 1 together with a recording medium 203 and a network storage 204. As shown in FIG. 9, the video player 1 can read, from the recording medium 203, digital video content data stored therein (data for reproduction of a video content such as a movie or a drama) and reproduce the video content and interactive data (data including menu data, animation data, and effect sound data that are reproduced in connection with the video content, content commentary data such as commentaries on the video content, and quizzes). When connected to the network storage 204 via the Internet 202, the video player 1 can acquire video content data from the network storage 204 and reproduce a video content and interactive data.

The video player 1 is equipped with a hard disk drive 2, a flash memory 3, a disc drive 4, and a network controller 5 all of which are connected to a bus 19. As for the hard disk drive 2, digital data such as video content data are recorded on a magnetic disk which rotates at high speed. Digital data is written to and read from the hard disk drive 2. As for the flash memory 3, digital data such as video content data are recorded therein and digital data is written to and read from it. The disc drive 4 has a function of reading digital data such as video content data from the recording medium 203 and outputting a reproduction signal. The network controller 5 controls reading and writing of digital data such as video content data that are performed with the network storage 204 over the Internet 202.

The video player 1 is also equipped with an MPU (microprocessing unit) 6, a memory 7, a ROM 8, and a video memory 9 all of which are connected to the bus 19. The MPU 6 is activated according to an activation program that is read from the ROM 8 into the memory 7. The MPU 6 reads a player program from the ROM 8 into the memory 7, controls system initialization, system ending, etc. according to the player program, and controls processing performed by a system microcomputer 16. Furthermore, the MPU 6 instructs a data processor 10 (described later) to reproduce video and audio on the basis of video content data that is read from one of the recording medium 203, the network storage 204, the hard disk drive 2, and the flash memory 3. Data and programs that are used when the CPU 6 operates are stored in the memory 7. The ROM 8 is stored with programs to be run by the MPU 6 such as the activation program and the player program, programs to be run by the data processor 10 (e.g., a video reproducing program for reproducing video and audio by decoding compression-coded moving image/audio data such as video content data), permanent data, etc. Decoded image data D (described later) are sequentially written to the video memory 9.

Operating according to the video reproducing program, the data processor 10 reproduces video and audio by separating compression-coded moving image/audio data into moving image data and audio data and decoding them. The system microcomputer 16 displays reproduction information of a video content on a display module 17, and supplies, to the MPU 6, via the bus 19, an input signal that is input from a user input device 18 (i.e., a device that enables input of an input such as a remote controller or input buttons provided on the video player 1). The display module 17 has a liquid crystal panel, and displays, on the liquid crystal panel, a video content and various kinds of information relating to reproduction of interactive data.

(Moving Image Decoder 100)

Figure 1:
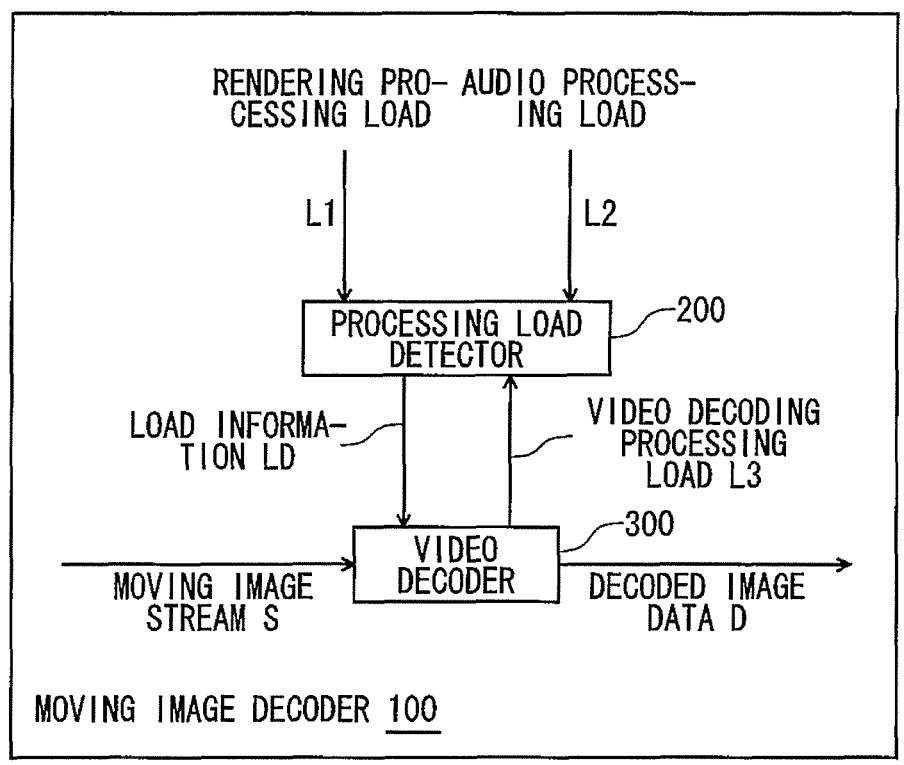
FIG. 1 is a block diagram showing the configuration of a moving image decoder according to a first embodiment of the present invention, which includes a video decoder and a processing load detector.

FIG. 1 is a block diagram showing the internal configuration of the moving image decoder 100 which is provided in the video player 1. The moving image decoder 100 is a software decoder which is implemented as a moving image decoding processing program which is a module of the video reproducing program. The moving image decoding processing program is software for decoding moving image stream data (hereinafter referred to as a moving image stream and is video content data, for example) that was coded by a coding method defined in the H.264/MVC standard. The moving image decoding processing program is run by the data processor 10. The moving image decoding processing program has functions corresponding to a processing load detector 200 (a processing load detecting module of the moving image decoding processing program) and a video decoder 300 (a decoding execution module of the moving image decoding processing program).

The processing load detector 200 has a function of a load detector for detecting the magnitude of various processing loads (hereinafter referred to as internal processing loads) that occur inside the video player 1 and include a processing load of decoding performed by the video decoder 300. In this embodiment, the internal processing loads to be detected are a rendering processing load L1 of rendering for generating an image to be displayed as a visualized version of reproduced video data, an audio processing load L2 of audio output, and a video decoding processing load L3 of decoding performed by the video decoder 300.

The processing load detector 200 generates load information LD which indicates the magnitude of detected internal processing loads, and supplies it to the video decoder 300. The load information LD is used for judging whether or not the amount of the internal processing loads of the video player 1 is so large as to hinder the execution of decoding processing of the video decoder 300.

As described later in detail, the video decoder 300 receives a moving image stream S, decoding it, and outputs decoded image data D.

Figure 2:
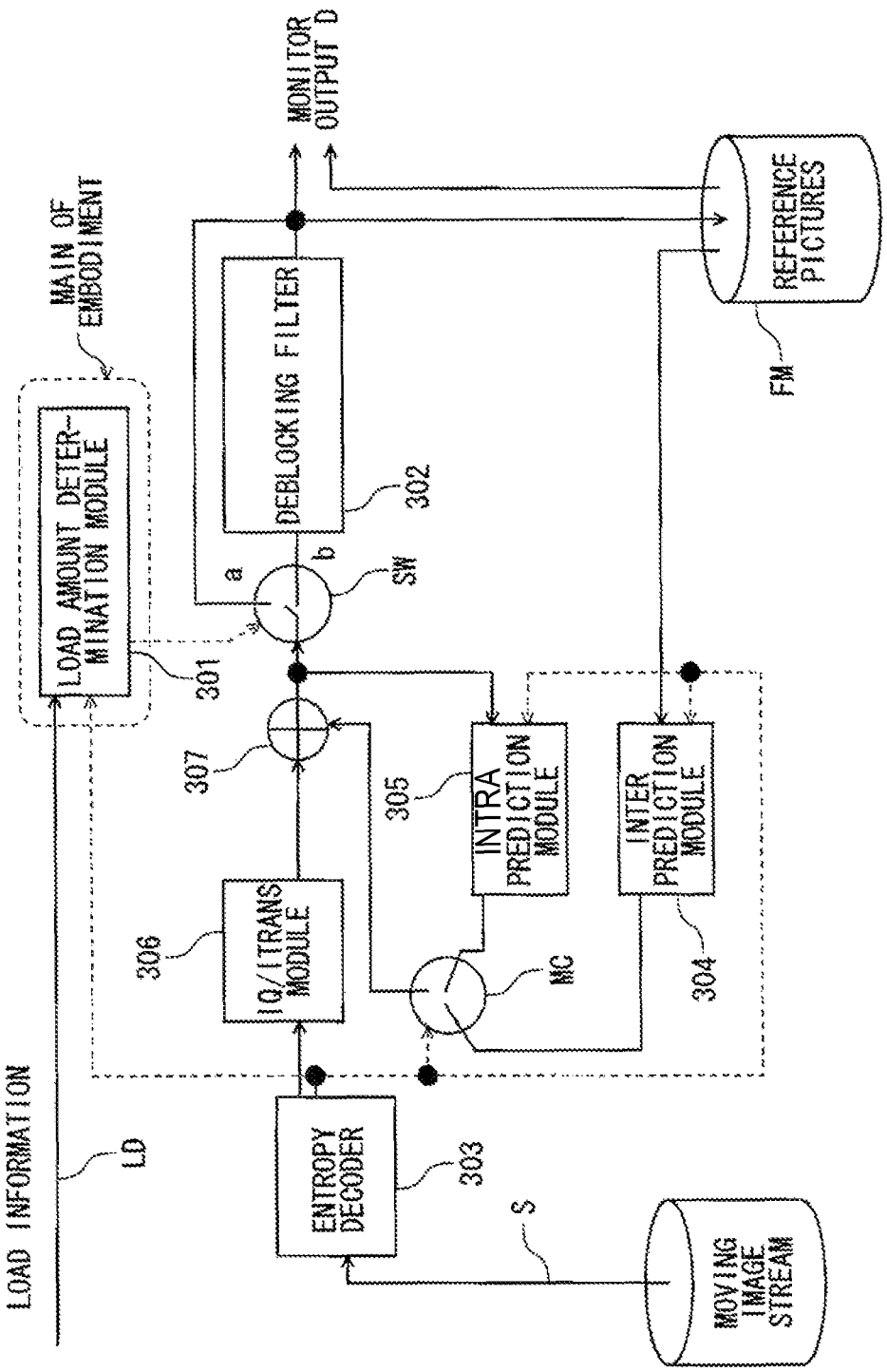
FIG. 2 is a block diagram showing the configuration of an H.264/MVC video decoder used in the first embodiment.

FIG. 2 is a block diagram of the video decoder 300. The video decoder 300 is the same as a general H.264 decoder except that the former is equipped with a load amount determination module 301 which is an important feature of the embodiment and a control signal that is output from the load amount determination module 301 is used for controlling a switch SW which is provided upstream of a deblocking filter 302.

An externally input moving image stream S is input to an entropy decoder 303. The entropy decoder 303 decodes variable-length-coded data and outputs quantization DCT coefficients, motion vector information, intra prediction information, and mode information in separated form. In doing so, for example, the entropy decoder 303 processes each macroblock of a decoding subject frame in units of a block (4×4 pixels or 8×8 pixels).

Among the output data of the entropy decoder 303, the motion vector information is input to an inter prediction module 304, the intra prediction information is input to an intra prediction module 305, and the mode information is input to a mode changeover switch MC.

An IQ/ITRANS module (inverse quantization/inverse quadrature transforming module) 306 performs inverse quantization and thereby converts 4×4 quantized DCT coefficients of a decoding subject block into 4×4 DCT coefficients (quadrature transform coefficients). Furthermore, the IQ/ITRANS module 306 performs inverse DCT (inverse quadrature transform) processing and thereby converts the 4×4 DCT coefficients into 4×4 pixel values, which are a prediction error signal corresponding to the decoding subject block. The prediction error signal is input to an adder 307. A flow of converting 8×8 quantized DCT coefficients into 8×8 pixel values is the same as the above flow of converting 4×4 quantized DCT coefficients into 4×4 pixel values.

In an intra prediction mode, the intra prediction module 305 is selected by the mode changeover switch MC. Therefore, the adder 307 adds, to the prediction error signal, an intra prediction signal that is supplied from the intra prediction module 305. In an inter prediction mode, the inter prediction module 304 is selected by the mode changeover switch MC. Therefore, the adder 307 adds, to the prediction error signal, a motion compensation inter-frame prediction signal that is obtained by motion vector prediction, interpolation prediction, and weighted prediction.

The load amount determination module 301 determines, according to a load amount, whether to perform deblocking filter processing, and outputs a signal for switching the switch SW according to a determination result. The load amount determination module 301 will be described later in detail.

The deblocking filter 302 performs deblocking filter processing on each frame that has been decoded in units of a block (4×4 pixels or 8×8 pixels) to reduce block noise. Among boundaries (edges) between pairs of adjoining blocks, boundaries having a continuity-breaking step are subjected to deblocking filter processing. The deblocking filter processing is processing of smoothing the boundary by eliminating the step. Not all boundaries between adjoining blocks are subjected to deblocking filter processing; only boundaries that need to be smoothed (whose steps need to be eliminated) are subjected to deblocking filter processing.

The deblocking filter processing prevents an event that block distortion is included in a reference picture and thereby transferred to a decoded image. The deblocking filter 302 performs deblocking filter processing adaptively in such a manner as to perform it strongly on a portion where block distortion is more likely occurs and weakly on a portion where block distortion is less likely occurs.

Each frame that has been subjected to the deblocking filter processing or bypassed the deblocking filter 302 under the control of the load amount determination module 301 is output as a monitor image or input to a frame memory FM as a reference picture. Each reference picture is output from the frame memory FM as a monitor image with prescribed output timing.

Each frame (reference frame) to be used as a reference picture for motion compensation inter-frame prediction is stored in the frame memory FM for a prescribed time.

Next, the motion vector prediction, interpolation prediction, and weighted prediction which are performed in the inter prediction module 304 will be described. Motion vector prediction information is calculated by performing motion vector prediction on the basis of pieces of motion vector information of decoded neighboring blocks acquired from the frame memory FM. A motion vector is calculated on the basis of motion vector difference information and motion vector prediction information corresponding to a processing subject block. An H.264 motion vector is of ¼-pixel precision, and prediction interpolation pixels (motion compensation inter-frame prediction signal) of ¼-pixel precision is generated on the basis of pixels of integer precision of a reference frame. A weighted motion compensation inter-frame prediction signal is generated by performing processing of multiplying the motion compensation inter-frame prediction signal by weight coefficients (weighted prediction) in units of a motion prediction block.

The intra prediction module 305 generates an intra prediction signal on the basis of pixel values of blocks that are adjacent to a decoded processing subject block and are acquired from the frame memory FM according to intra prediction information that is input from the entropy decoder 303.

Figure 8:
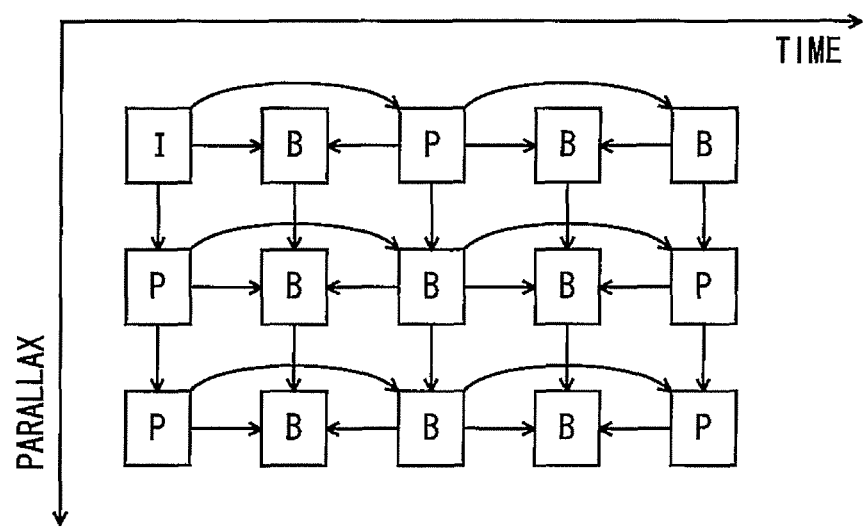
FIG. 8 illustrates H.264/MVC inter-view prediction used in the first embodiment.

As shown in FIG. 8, in the multiview moving image coding scheme H.264/MVC, the coding efficiency is increased by using inter-view prediction with referencing between pictures having different parallaxes (indicated by downward arrows) in addition to prediction between pictures having the same parallax (indicated by horizontal arrows). In the inter-view prediction, since a picture of the same time point and a different viewing point is referred to, high correlation is obtained. And it is considered that similar values are obtained in a large part of the region concerned as long as a picture of an adjacent viewing point is referred to. Therefore, both of image quality degradation and the decoding processing amount can be suppressed if decoding processing in which the deblocking filter processing is omitted is performed on a block that is being decoded using the inter-view prediction, under the following condition.

Figure 3:
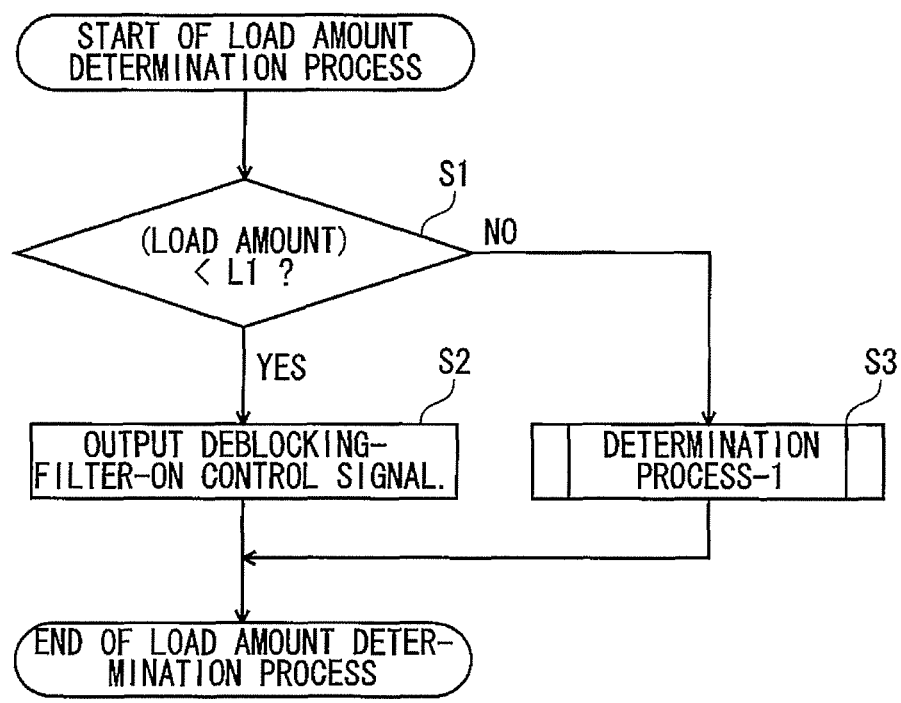
FIG. 3 is a flowchart of a load amount determination process according to the first embodiment.

Next, the load amount determination module 301 which is an important feature of the embodiment will be described. The load amount determination module 301 determines a load amount on the basis of received information and outputs a signal indicating whether to bypass the deblocking filter 302. FIG. 3 is a flowchart of a determination process which is executed by the load amount determination module 301. If the load amount is smaller than a threshold value L1 (S1: yes), at step S2 the load amount determination module 301 outputs a control signal (deblocking-filter-on control signal) for switching the switch SW to the b side so that deblocking filter processing is performed ordinarily. If load amount is larger than or equal to the threshold value L1 (S1: no), a determination process-1 is executed at step S3.

Figure 4:
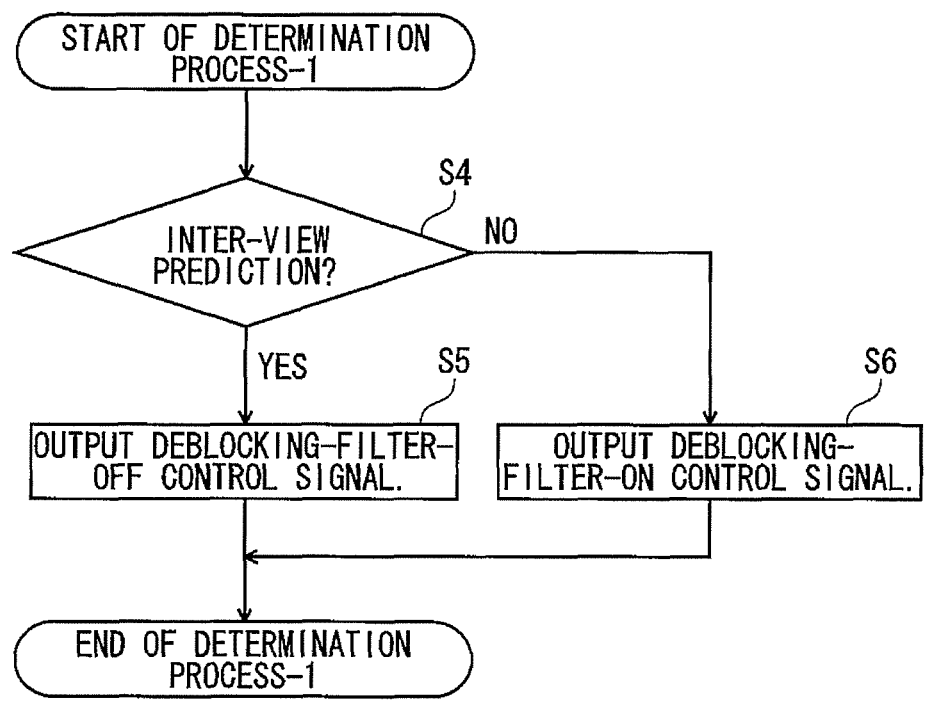
FIG. 4 is a flowchart of a determination process-1 of the process of FIG. 3.

FIG. 4 is a flowchart of the determination process-1. If inter-view prediction is being performed between two adjoining blocks (S4: yes), at step S5 the load amount determination module 301 outputs a control signal (deblocking-filter-off control signal) for switching the switch SW to the a side so that deblocking filter processing is not performed. If the determination result of step S4 is negative, at step S6 the load amount determination module 301 outputs a deblocking-filter-on control signal ordinarily. Since the inter-view prediction is prediction using blocks belonging to frames of the same time point and different viewing points, their images would be similar. Therefore, pixel value discontinuity (block distortion) at block boundaries would be relatively inconspicuous. This process is highly effective in load reduction because deblocking filter processing is not performed on more blocks with a single determination. However, on the other hand, this process has certain influence on the image quality. As such, this process is suitable for use in a very heavy load state.

Embodiment 2

A second embodiment will be described below mainly referring to FIGS. 5-7. Modules, steps, etc. having the same ones in the first embodiment (excluding the features shown in FIG. 3) will not be described in detail.

Figure 5:
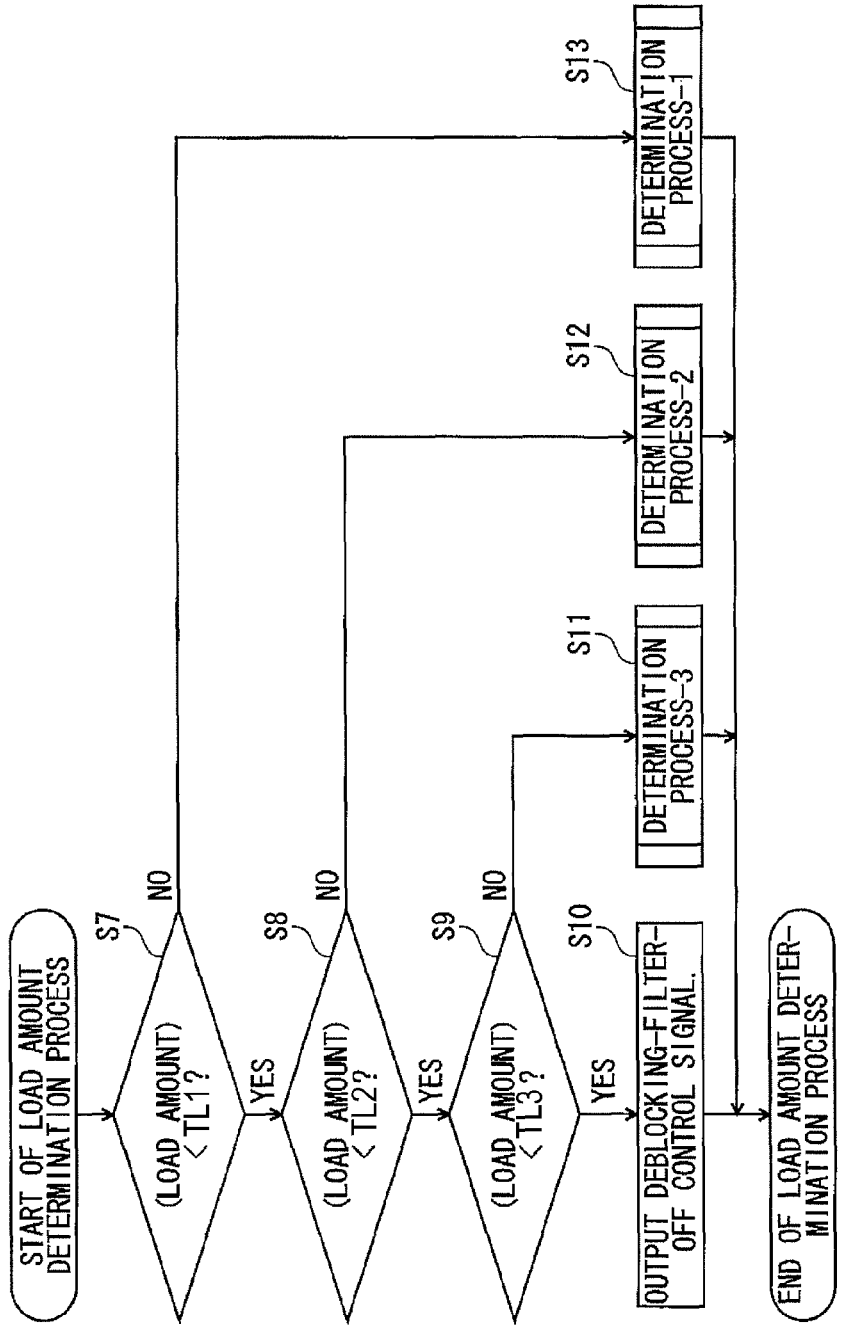
FIG. 5 is a flowchart of a load amount determination process according to a second embodiment.

FIG. 5 is a flowchart of a load determination process for switching between determination processes. In FIG. 5, threshold values TL1-TL3 have a magnitude relationship TL1>TL2>TL3, where "TL" denotes "threshold for load".

If the load amount is smaller than the threshold value TL1 (S7: yes), the process moves to step S8. If the determination result of step S7 is negative, the determination process-1 is executed at step S13.

If the load amount is smaller than the threshold value TL2 (S8: yes), the process moves to step S9. If the determination result of step S8 is negative, a determination process-2 is executed at step S12.

If the load amount is smaller than the threshold value TL3 (S9: yes), at step S10 the load amount determination module 301 outputs a deblocking-filter-on control signal. If the determination result of step S9 is negative, a determination process-3 is executed at step S11.

Figure 6:
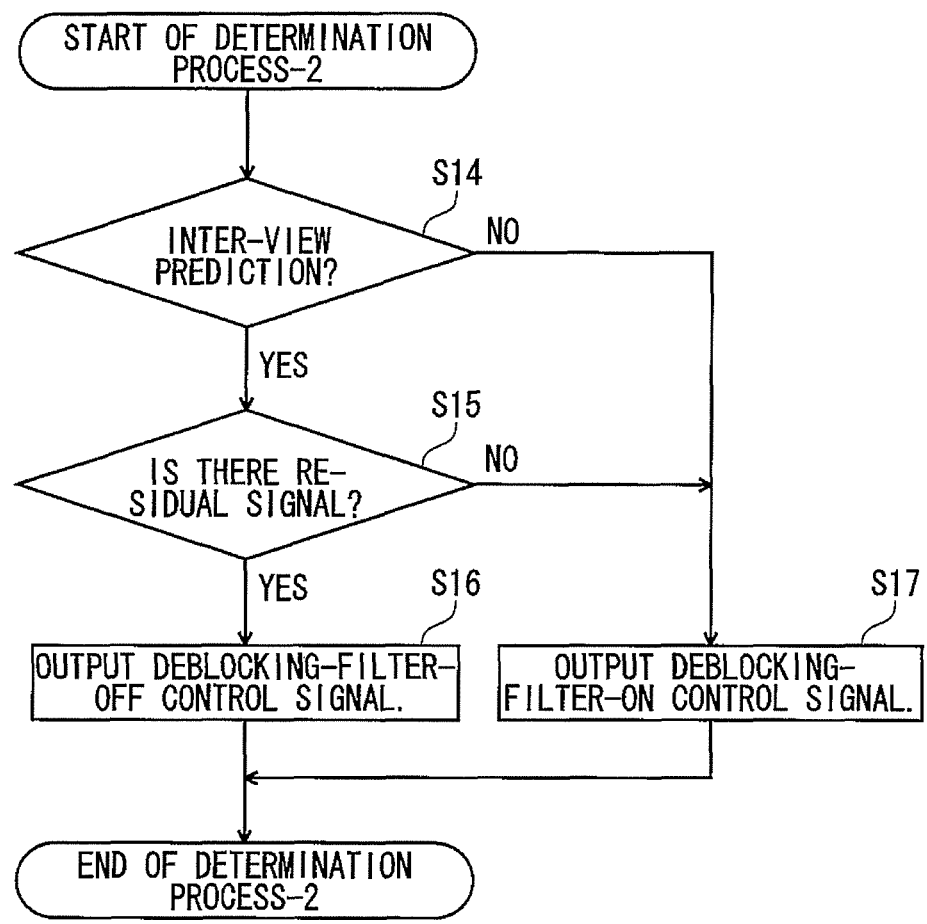
FIG. 6 is a flowchart of a determination process-2 of the process of FIG. 5.

FIG. 6 is a flowchart of a determination process-2 which is executed at step S12.

If inter-view prediction is being performed between two adjoining blocks (S14: yes), the process moves to step S15. If the determination result of step S14 is negative, at step S17 the load amount determination module 301 outputs a deblocking-filter-on control signal ordinarily.

If the two adjoining blocks have a residual signal (DCT coefficients) (S15: yes), at step S16 the load amount determination module 301 outputs a deblocking-filter-off control signal. If the determination result of step S15 is negative, at step S17 the load amount determination module 301 outputs a deblocking-filter-on control signal ordinarily.

Figure 7:
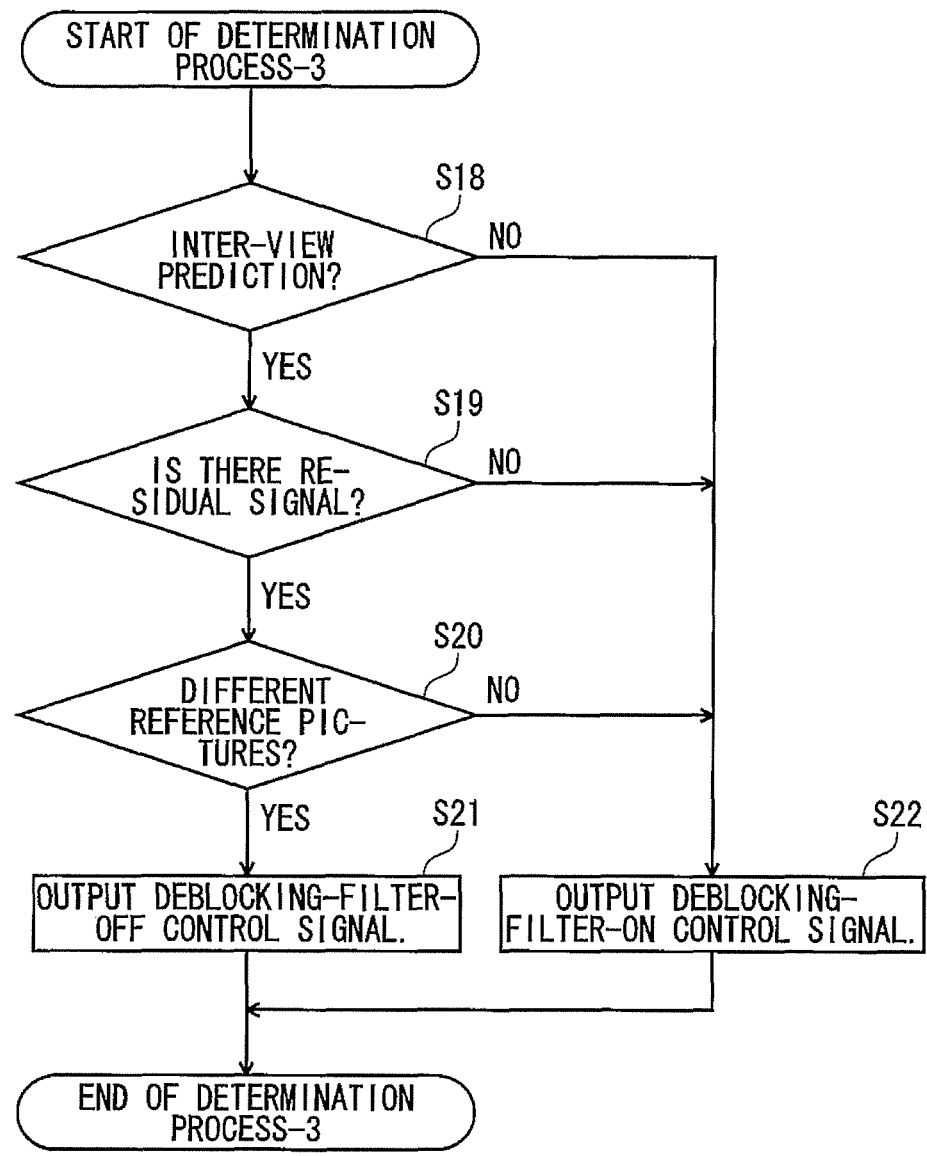
FIG. 7 is a flowchart of a determination process-3 of the process of FIG. 5.

FIG. 7 is a flowchart of a determination process-3 which is executed at step S11.

If inter-view prediction is being performed between two adjoining blocks (S18: yes), the process moves to step S19. If the determination result of step S18 is negative, at step S22 the load amount determination module 301 outputs a deblocking-filter-on control signal ordinarily.

If the two adjoining blocks have a residual signal (DCT coefficients) (S19: yes), the process moves to step S20. If the determination result of step S19 is negative, at step S22 the load amount determination module 301 outputs a deblocking-filter-on control signal ordinarily.

If the two adjoining blocks have different reference pictures (S20: yes), at step S21 the load amount determination module 301 outputs a deblocking-filter-off control signal. If the determination result of step S20 is negative, at step S22 the load amount determination module 301 outputs a deblocking-filter-on control signal ordinarily.

As described above, part of the process executed by the video decoder 300 is omitted according to the load of a processor or the battery residual capacity in an AV apparatus. As a result, the power consumption can be reduced and real-time decoding of a multiview moving image can be realized which requires an enormous processing amount.

This is based on the following facts. In the inter-view prediction, since a picture of the same time point and a different viewing point is referred to, high correlation is obtained. And it is considered that similar values are obtained in a large part of the region concerned as long as a picture of an adjacent viewing point is referred to. That is, since pixel signals of adjoining blocks are expected to be high in continuity, block distortion would not be conspicuous even if the above part of the process is skipped.

According to the embodiment, attention is paid to similarity between such pictures and deblocking filter processing is omitted in decoding processing of a block for which inter-view prediction is performed. More specifically, in the device 100 for decoding a moving image (see FIG. 1), the following pieces of processing are performed to reduce the decoding processing amount:

(1) The processing load detector 200 detects a total processing load on the basis of a processing load of the video decoder 300 and loads of pieces of non-video processing such as audio processing and rendering. In the video decoder 300, a control is made so that simplified processing is performed according to load information (see FIG. 2).

(2) If simplified processing is commanded in decoding processing of the video decoder 300 (see FIG. 3 or 5), a control is made so that deblocking processing is omitted for a block for which inter-view prediction is performed.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A moving image decoder for decoding a compression-coded moving image stream, the decoder comprising:
   a deblocking filter to perform deblocking filter processing on each of the frames to be decoded;
   a load detector to detect a magnitude of an internal processing load within a video player;
   a determination module to determine whether or not to bypass the deblocking filter processing, depending on the magnitude of the internal processing load,
   wherein the deblocking filter bypasses the deblocking filter processing when (1) the magnitude of the internal processing load is equal to or larger than a first threshold value and a first condition that two adjacent blocks in the frame are decoded using inter-view prediction is fulfilled, (2) the magnitude of the internal processing load is smaller than the first threshold and is equal to or larger than a second threshold value that is smaller than the first threshold and a second condition that the two adjacent blocks have a residual signal are fulfilled, and (3) the magnitude of the internal processing load is smaller than the second threshold and equal to or larger than a third threshold value that is smaller than the second threshold and a third condition that the two adjacent blocks have different reference pictures is fulfilled.

2. The decoder of claim 1, wherein a reference picture is a frame for motion compensation inter-frame prediction.

3. The decoder of claim 1, wherein a reference picture includes information for use in inter-frame prediction.

4. The decoder of claim 1, further comprising:
   a monitor to display each of the decoded frames thereon.

5. A moving image decoding method of decoding a compression-coded moving image stream, the method comprising:
   performing deblocking filter processing on each of the frames to be decoded;
   detecting a magnitude of an internal processing load within a video player;
   determining whether or not to bypass the deblocking filter processing, depending on the magnitude of the internal processing load; and
   bypassing the deblocking filter processing when (1) the magnitude of the internal processing load is equal to or larger than a first threshold value and a first condition that two adjacent blocks are decoded using inter-view prediction (2) the magnitude of the internal processing load is smaller than the first threshold and equal to or larger than a second threshold value that is smaller than the first threshold and a second condition that the two adjacent blocks have a residual signal are fulfilled, and (3) the magnitude of the internal processing load is smaller than the second threshold and equal to or larger than a third threshold value that is smaller than the second threshold and a third condition that the two adjacent blocks have different reference pictures are fulfilled.

6. The method of claim 5, wherein a reference picture is a frame for motion compensation inter-frame prediction.

7. The method of claim 5, wherein a reference picture includes information for use in inter-frame prediction.

8. The method of claim 5, further comprising:
   displaying each of the decoded frames on a monitor.

* * * * *